US005082709A

United States Patent [19]

Suzuki et al.

[11] Patent Number: 5,082,709

[45] Date of Patent: Jan. 21, 1992

[54] THIN FILM-TYPE MAGNETIC DISK

[75] Inventors: Takashi Suzuki, Takatsuki; Yoshiaki Kai, Neyagawa, both of Japan

[73] Assignee: Matsushita Electric Industrial Co., Ltd., Osaka, Japan

[21] Appl. No.: 474,926

[22] Filed: Feb. 5, 1990

[30] Foreign Application Priority Data

Feb. 8, 1989 [JP] Japan ................................. 1-029108

[51] Int. Cl.$^5$ ............................................ G11B 23/00

[52] U.S. Cl. ..................................... 428/64; 428/141; 428/611; 428/694; 428/695; 428/500; 428/928

[58] Field of Search ................. 422/64, 141, 143, 694, 422/695, 900, 928, 611, 480; 300/135

[56] References Cited

U.S. PATENT DOCUMENTS

| | | | |
|---|---|---|---|
| 4,326,229 | 4/1982 | Yanagisawa | 428/64 |
| 4,698,251 | 10/1987 | Fukuda et al. | 360/135 |
| 4,725,470 | 2/1988 | Katsuki | 428/65 |
| 4,735,840 | 4/1988 | Hedgcoth | 428/65 |
| 4,804,590 | 2/1989 | Nakamura et al. | 428/695 |
| 4,828,899 | 5/1989 | Arioka et al. | 428/143 |
| 4,873,138 | 10/1989 | Okita | 428/695 |
| 4,939,614 | 7/1990 | Shirakura et al. | 360/135 |
| 4,973,496 | 11/1990 | Kruger et al. | 428/64 |

*Primary Examiner*—Paul J. Thibodeau

*Attorney, Agent, or Firm*—Stevens, Davis, Miller & Mosher

[57] ABSTRACT

A thin film-type magnetic disk includes a non-magnetic substrate having fine particle-like projections provided over at least the entirety of the recording areas of the magnetic disk. The fine particle-like projections are formed either on bulged portions of the substrate or are provided in the form of bands. The bulged portions and the bands extend substantially parallel to a direction of movement of a magnetic head relative to the magnetic disk. A magnetic layer, a protective layer and a lubricant layer are sequentially formed on the substrate.

3 Claims, 2 Drawing Sheets

17 14 16 15 12 13 11

THIN FILM-TYPE MAGNETIC DISK

BACKGROUND OF THE INVENTION

This invention relates to a thin film-type magnetic disk which is used, for example, in a magnetic memory for a computer and is suited for high-density recording.

As a thin film-type magnetic disk using a thin film of metal or metal oxide as a magnetic layer, there has been practically used one which usually comprises a non-magnetic substrate formed by subjecting an anodizing treatment, Ni·P plating or the like to a surface of an aluminum alloy plate, and a thin film magnetic layer formed on the substrate by a vacuum thin film-forming or deposition process or a plating process. Generally, there is employed a so-called contact start-stop (CSS) system in which a magnetic head floats or lifts away from the disk surface at the time of start of the magnetic disk, and contacts the disk surface at the time of stop of the magnetic disk. In this case, in order that the disk surface can withstand a sliding contact with the magnetic head and a slider at the time of start or stop of the magnetic disk, and also that the magnetic head and the slider can be prevented from adhering to the disk surface due to adsorbed water or condensed water in a highly humid environment when the magnetic disk is stopped (this phenomenon is a so-called adhesion phenomenon), and further that a magnetic anisotropy can be enhanced to secure a high output, the disc surface is usually formed into a corrugated or undulatory configuration having bulged portions extending in the direction of movement of the magnetic head relative to the disk. The corrugated configuration is formed as a result of a texture processing applied to the substrate surface. Further, a protective film made mainly of graphite, $SiO_2$ or the like is formed on the magnetic thin film, and a lubricant layer is formed on the protective film.

In order to improve a recording density, it is necessary to reduce the floating distance of the magnetic head. In this case, if the surface properties are improved by reducing the height of the bulged portions provided by the texture processing, the CSS withstanding ability and the ability of preventing the adhesion of the magnetic head are correspondingly sacrificed. As a result, it is difficult to secure a satisfactory practical performance.

The texture processing is generally to produce fine scars in the surface of the disk substrate by abrasion using abrasive grains, the scars being distributed in the circumferential direction of the disk substrate surface. Its bulged configuration has a very gentle gradient in the circumferential direction of the magnetic disk much like a ridge or crest of a mountain. The configuration of such a gentle gradient, when it receives an impact force from the magnetic head, is liable to be deformed and broken, and is liable to be in face contact when the magnetic disk slides relative to the magnetic head, thus exhibiting a higher coefficient of friction as compared with a point contact.

In view of the foregoing, an extensive study has been made, and it has now been concluded that the best means for reducing the floating distance of the magnetic head and for securing a practical reliability is to reduce the height of the circumferentially-extending bulged portions and also to provide a number of fine particle-like projections of a sharp gradient at least on that portion of each bulged portion which is in the vicinity of the top of the bulged portion and contacts the magnetic head, thereby providing a point contact between the magnetic head and the surface of the magnetic disk.

Also, it has now been found that similar effects can be achieved by removing the circumferentially-extending bulged portions and by providing groups of fine particle-like projections of a sharp gradient in narrow bands in the circumferential direction of the disk. However, it has been found that when such fine particle-like projections are distributed over the entire flat smooth surface having no bulged portion, there arises another problem that the head adhesion phenomenon occurs.

SUMMARY OF THE INVENTION

It is therefore an object of this invention to provide a thin film-type magnetic disk which overcomes the above problems.

According to a first aspect of the present invention, there is provided a thin film-type magnetic disk comprising a non-magnetic substrate having bulged portions which are provided at least over entire recording areas of the magnetic disk and extend substantially parallel to a direction of movement of a magnetic head relative to the magnetic disk, the substrate having fine particle-like projections formed at least on the bulged portions; a magnetic layer formed on the substrate; a protective layer formed on the magnetic layer; and a lubricant layer formed on the protective layer.

According to a second aspect of the invention, there is provided a thin film-type magnetic disk comprising a non-magnetic substrate having fine particle-like projections provided at least over entire recording areas of the magnetic disk, the fine particle-like projections being provided at a high density to form bands of the fine particle-like projections extending substantially parallel to a direction of movement of a magnetic head relative to the magnetic disk; a magnetic layer formed on the substrate; a protective layer formed on the magnetic layer; and a lubricant layer formed on the protective layer.

According to a third aspect of the invention, there is provided a thin film-type magnetic disk comprising a non-magnetic substrate having bands of fine particle-like projections which are provided at least over entire recording areas of the magnetic disk and extend substantially parallel to a direction of movement of a magnetic head relative to the magnetic disk; a magnetic layer formed on the substrate; a protective layer formed on the magnetic layer; and a lubricant layer formed on the protective layer.

In the thin film-type magnetic disk, in the case where the magnetic thin film is made of a metal type, such as CoP, CoNi, CoNiP, CoNiCr and CoCr, its thickness is about 500 Å. In the case where the magnetic thin film is made of an oxide type such as $\gamma$-$Fe_2O_3$, its thickness is about 1000 Å. The overall thickness even including a primary coat and the surface protective layer is thin on the order of less than several 1000 Å. Therefore, the shape of the surface of the substrate is generally directly reflected on the shape of the surface of the disk. Hence, the fine particle-like projections, similar to the fine particle-like projections on the non-magnetic substrate, also appear on the disk surface.

In the magnetic disk according to the present invention, when the magnetic head contacts the disk surface at the time of the CSS and at the time of stop of the disk, the contact on the part of the disk takes place on the fine particle-like projections. Therefore, the surface of the magnetic head contacts a number of points on the disk surface. As a result, the frictional resistance is reduced, the CSS withstanding properties are improved, and the adhesion of the magnetic head is prevented. The lubricant applied to the disk surface is retained in the spaces between the fine particle-like projections on the disk surface, and is supplied to the tops of the fine particle-like projections due to a surface tension. Further, because of the bulges extending circumferentially of the disk surface or of the bands of fine particle-like projections, the magnetic anisotropy is enhanced to achieve a high output.

DESCRIPTION OF THE PREFERRED EMBODIMENTS OF THE INVENTION

The invention will now be described with reference to FIGS. 1 to 4 which respectively show, on an enlarged scale, surface portions cut from four preferred embodiments of magnetic disks of the present invention. In each of these Figures, the direction indicated by an arrow is the direction of movement of a magnetic head relative to the magnetic disk, that is, the circumferential direction of the magnetic disk.

Figure 1:
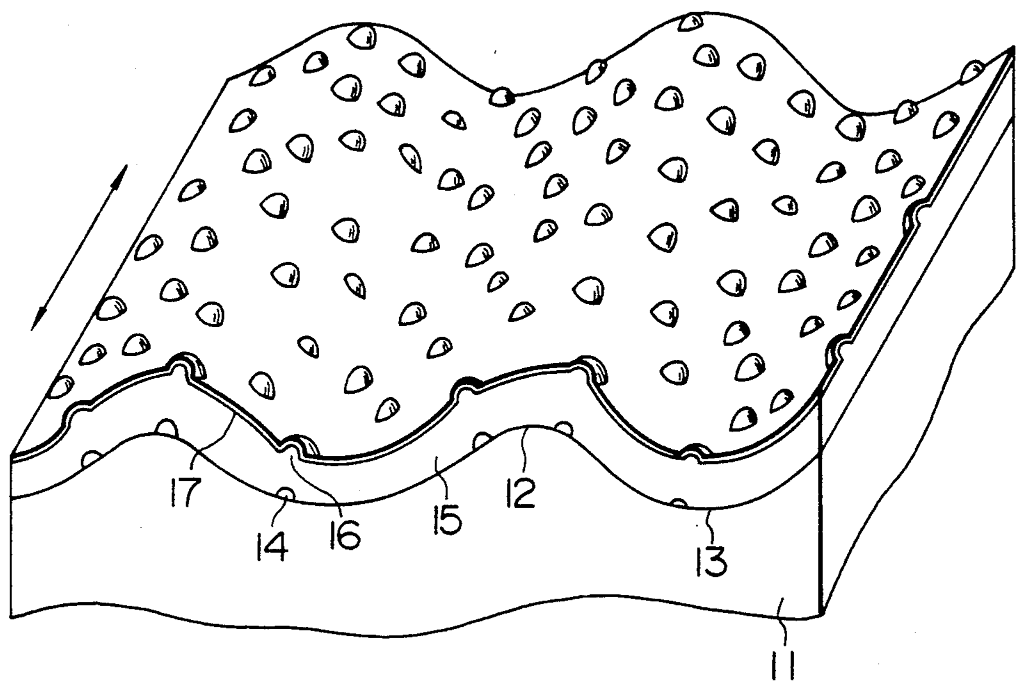
FIG. 1 is an enlarged perspective view of a surface portion cut from a magnetic disk provided in accordance with the present invention.
Figure 2:
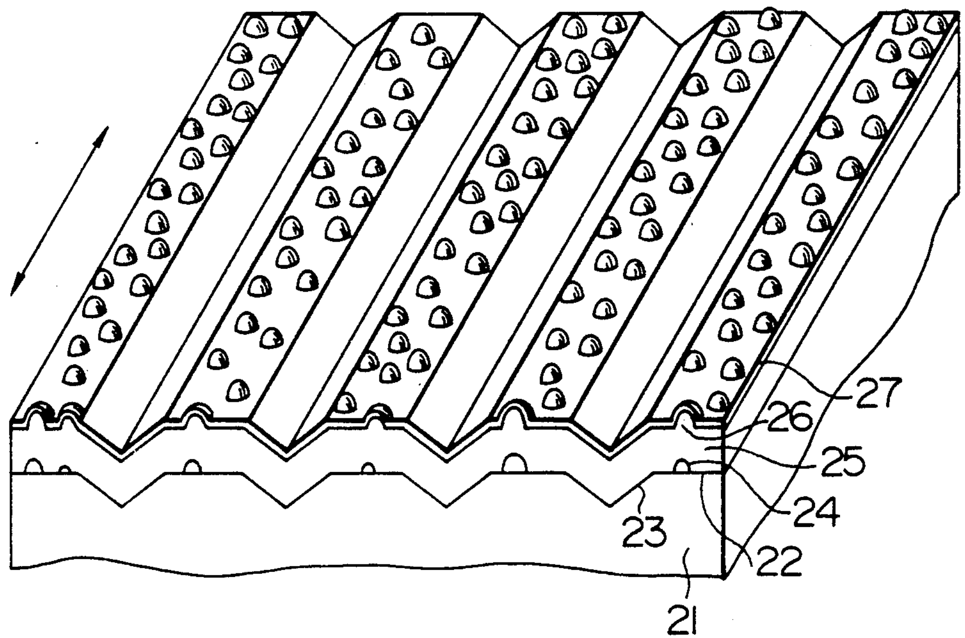
FIGS. 2 to 4 are views similar to FIG. 1, but showing modified magnetic disks of the invention, respectively.
Figure 3:
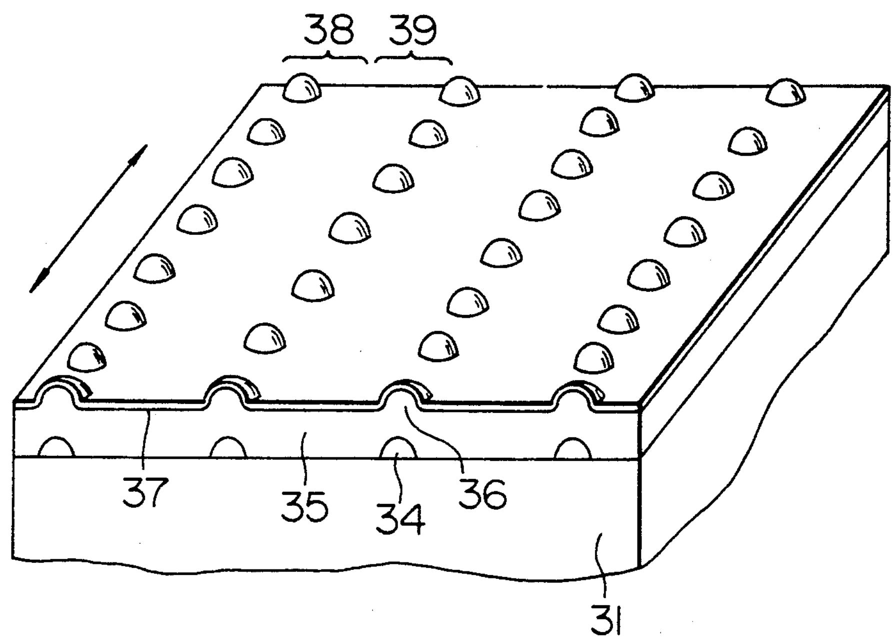
Figure 4:
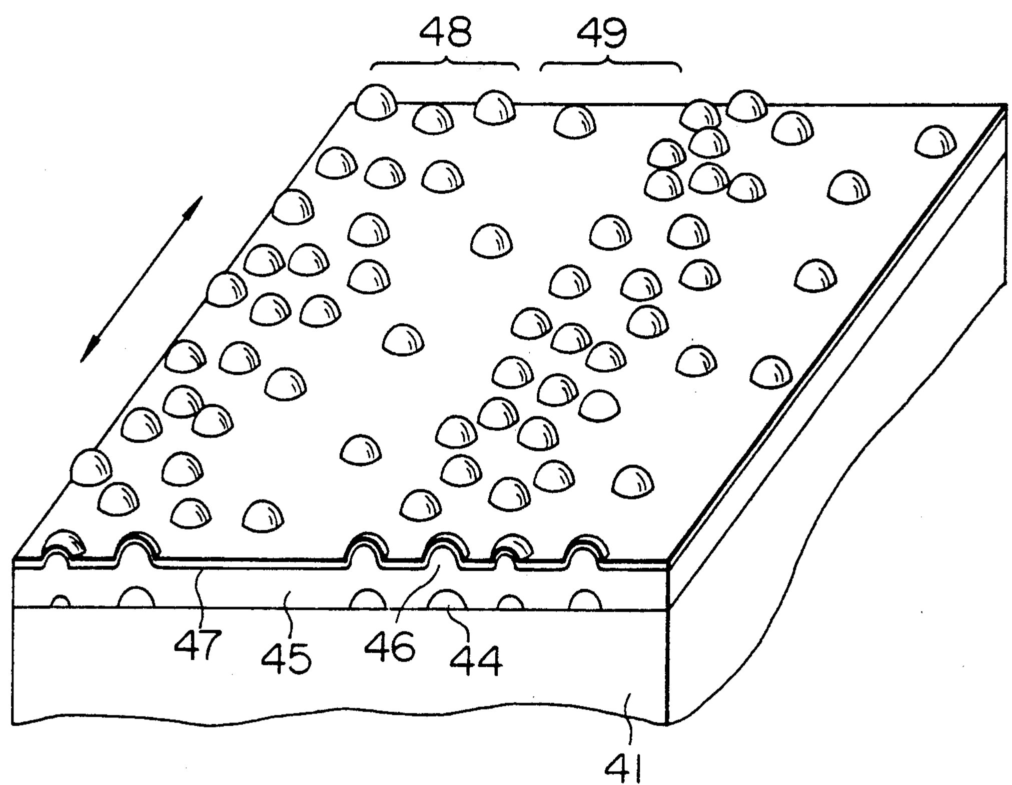

In FIGS. 1 to 4, reference numerals 11, 21, 31 and 41 denote a substrate, reference numerals 12 and 22 denote bulged portions formed on the substrate surface and extending in the circumferential direction of the disk, reference numerals 13 and 23 denote grooves formed in the substrate surface, reference numerals 14, 24, 34 and 44 denote fine particle-like projections formed on the substrate surface, reference numerals 15, 25, 35 and 45 denote a magnetic layer, reference numerals 16, 26, 36 and 46 denote fine particle-like projections formed on the magnetic layer surface and corresponding respectively to the fine particle-like projections 14, 24, 34 and 44 on the substrate surface, and reference numerals 17, 27, 37 and 47 denote, in combination, a protective film on the magnetic layer and a lubricant layer on the protective layer. In FIG. 3, reference numeral 38 denotes a region where the fine particle-like projections 36 are present in the form of a band, and reference numeral 39 denotes a region where the fine particle-like projection 36 is not present. In FIG. 4, reference numeral 48 denotes a region where the density of distribution of the fine particle-like projections 48 is high to form a band of these projections, and reference numeral 49 denotes a region where this density is low.

As the substrate 11, 21, 31, 41 used here in the illustrated embodiments of the invention, there can be used a plate having a flat smooth surface, such as an aluminum or an aluminum alloy plate which is processed or treated by anodizing, NiP plating or a resin such as polyimide, a glass plate, a ceramic plate, a plastic molded plate and a reinforced plastic molded plate. Also, these plates having circumferentially-extending bulged portions 12, 22 formed on a reverse surface thereof can be used. The fine particle-like projections 14, 24, 34, 44 can be formed, for example, by adhering non-magnetic fine particles of any suitable kind to the substrate surface either by its own nature or by a resin binder. In this case, examples of the non-magnetic fine particles include inorganic fine particles of alumina, silica, titanium oxide or the like, fine particles of a polymer compound of polyester, polyamide, polyarylate, polysulfone, polyphenylene oxide, polyimide, epoxy, cross-linked styrene, cross-linked acryl, cross-linked benzoguanamine, cross-linked melamine or the like, fine particles of carbon, and fine particles of a hydrolysate of metal alkoxide. Examples of the resin binder include a saturated polyester such as polyethylene terephthalate and polybutaylene terephthalate, a polyamide such as nylon 6, nylon 66, nylon 610, nylon 11 and nylon 12, polystyrene, polycarbonate, polyarylate, polysulfone, polyether sulfone, polyacrylate, polyvinyl chloride, polyvinylidene chloride, polyvinyl butyral, polyvinyl alcohol, a phenoxy resin, polyimide, polyamideimide, a mixture of the above resins, and a copolymer thereof. Also, a cross-linking resin such as an epoxy resin, a urethane resin, a silicone resin and a phenol resin can be used.

A material, obtained by adding 50 to 300 parts by weight of the above fine particles to 100 parts by weight of a dilute solution of the above resin binder, is coated on the surface of the substrate 11, 21, 31, 41, so that the fine particle-like projections 14, 24, 34, 44 are formed. In this case, with respect to the non-magnetic substrate 41 in FIG. 4, if a rubbing treatment has been applied by a nylon brush to the substrate surface in the circumferential direction of the substrate, the fine particle-like projections 44 can be arranged in bands in the circumferential direction of the substrate. With respect to the non-magnetic substrate 31 in FIG. 3, such rubbing treatment is not applied to the substrate, and the fine particle-like projections 34 are formed on and distributed uniformly over the entire flat smooth surface of the substrate. Thereafter, this surface is lightly rubbed in the circumferential direction thereof by a brush of fine carbon fibers to remove selected ones of the above fine particle-like projections in band patterns, thereby forming the intended surface configuration.

Preferably, the height of the fine particle-like projections 14, 24, 34, 44 is 100 to 500 Å, and the ratio of the height to its length in the direction of the plane of the substrate is not less than 0.1. If the height is less than 100 Å and the ratio of the height to the length is less than 0.1, then the CSS withstanding ability and the head adhesion prevention ability are lowered. On the other hand, if the height is more than 500 Å, the output is lowered greatly, thus failing to achieve a high recording density. Preferably, the surface density of the fine particle-like projections 14, 24, 34, 44 at those areas where they are provided is $1 \times 10^7/mm^2$ to $1 \times 10^9/mm^2$. If the surface density is $1 \times 10^7/mm^2$ or more than $1 \times 10^9/mm^2$, the CSS withstanding ability and the head adhesion prevention ability ar lowered. The methods of forming the fine particle-like projections are not limited to the above-mentioned ones, and a sputtering method, an ion beam deposition method and a plating method can be used. Also, a wet coating method can be used in combination with these methods.

With respect to a method of forming the non-magnetic substrate 11, 22 having the bulged portions 12, 22 extending substantially parallel to the direction of movement of the magnetic head relative to the magnetic disk (that is, extending in the direction of the circumference of the disk) as shown in FIGS. 1 and 2, an ordinary texture processing can be used in the case where the substrate is made of metal. In the case where the substrate is made of a palstics material, a molding process can be used. In this case, preferably, the height of the bulged portions 12, 22 is 100 to 500 Å, and the pitch of the bulged portions in the radial direction of the disk is 0.1 to 10 μm. If the height is less than 100 Å and the pitch does not fall within the above range, the head adhesion prevention ability is lowered, and the magnetic anisotropy is not obtained. If the height is more than 500 Å, it is difficult to achieve a high recording density. Using the above-mentioned methods, the fine particle-like projections 14, 22 are formed on the substrate 11, 21 having the circumferentially-extending bulged portions 12, 22.

In the illustrated embodiments, preferably, the ratio of those areas (with which the magnetic head can be in direct contact) where the band-like fine particle-like projections are present to the entire surface area of the disk is 0.1 to 0.8. If this ratio is less than 0.1, the CSS withstanding ability is lowered, and if this ratio is more than 0.8, the head adhesion prevention ability is lowered.

As the magnetic layer 15, 25, 35, 45, there can be used a known thin film which can be obtained by a sputtering method, a vapor deposition method, a plating method, using CoP, CoNi, CoNiP, CoNiCr, CoCr, $\gamma$-$Fe_2O_3$ or the like. If necessary, a primary coating made, for example, of Cr or Ti can be provided. Preferably, the thickness of the magnetic thin film 15, 25, 35, 45 including the primary coat is 500 to 5000 Å.

As the protective layer, there can be used a thin film which is made of a suitable inorganic or organic nonmagnetic material and which has a thickness of 50 to 500 Å. Particularly, a carbon thin film of a suitable type obtained by sputtering or chemical vapor deposition (CVD) and a thin film of $SiO_2$ obtained by a wet method are best suited for the protective layer.

As the lubricant layer, perfluoroalkyl polyether, its derivative, any one of a fatty acid, a fatty ester, a fatty amide, a metal soap and a silicone compound having a fluoroalkyl group introduced thereinto, or a fluorine-type surface active agent can be suitably used. A suitable amount of the lubricant layer is 0.1 to 100 mg per 1 $m^2$ of the surface.

The embodiments will now be described in further detail by way of examples.

A NiP film of 30 μm thickness was formed by electroless plating on a mirror-buffed surface of an aluminum alloy plate of 95 mm diameter and 1.2 mm thickness. Then, its surface was buffed into a mirror surface, and a texture processing was applied to this surface by a polishing paper to form bulged portions extending in the circumferential direction of the plate. In this manner, a plurality of substrates A, B and C were prepared.

| Substrate | Height of bulged portions | Pitch of bulged portions |
|---|---|---|
| A | 300 Å | 1.0 μm |
| B | 120 Å | 0.5 μm |
| C | 60 Å | 0.5 μm |

A polyimide film of 10 μm thickness was formed by a wet coat method on a mirror finished surface of an aluminum alloy plate prepared according to the above procedure, and the surface was made flat and smooth. In this manner, a plurality of substrates D were prepared. The surface of some of the thus obtained substrates D was rubbed by a nylon brush in the circumferential direction of each substrate so weakly that no scarring would develop on the surface, thereby preparing a plurality of substrates E.

Aqueous solutions of polyvinyl alcohol of various concentrations, containing one of three kinds of silica colloids having respective average diameters of 50 Å, 150 Å and 400 Å, were coated respectively on some of the above substrates A to E, and were dried, thereby preparing substrates 11 and 21 having on their surfaces the fine particle-like projections as shown in FIG. 1 or FIG. 2. The silica colloid concentration was 500 to 5000 ppm, and the polyvinyl alcohol concentration was 500 to 2000 ppm. Some of the thus obtained substrates 11 and 21 were weakly rubbed by very fine carbon-fiber brush to remove the above coated film in the form of bands extending circumferentially of each substrate, thereby preparing substrates 31 and 41 having the band-like fine particle-like projections as shown in FIG. 3 and FIG. 4.

From SEM photographs of the surfaces and cut surfaces of the above various samples, the average height of the fine particle-like projections 14, 24, 34 and 44, the ratio of the height to the length thereof in the direction of the plane of the substrate, the surface density thereof, the width of the bands of these projections, etc., were determined. Then, by a sputtering method, a primary coating of Cr (1500 Å thick), a magnetic layer 15, 25, 35, 45 of CoNi (600 Å thick), a protective layer of carbon (200 Å thick) were sequentially formed, and finally a lubricant of a perfluoropolyether was coated to the protective layer in an amount of 1.5 mg per 1 $m^2$ of the surface, thereby preparing samples 1 to 21. Then, CSS measurement was carried out with respect to the above samples to evaluate their CSS withstanding ability. At that time, the CSS lifetime was decided by the number of the CSS obtained when the coefficient of friction exceeded 1.0 or the head crush occurred. With respect to an adhesion test, the slider was fixed on the disk and was left one day in an atmosphere of a temperature of 40° C. and a relative humidity of 90%, and then the disk was rotated. At that time, when an abnormal force is exerted on the disk, it was considered that the adhesion took place. Also, when a force twice that exerted on a normal product (disk) was encountered, this is indicated by Δ in Table below, and when more than a threefold force was encountered, this is indicated by X in the Table. The results of the CSS test and the adhesion test with respect to the above samples are shown in the Table below. Those samples put in parentheses in the column "Sample disk No." in the Table are comparative examples.

TABLE

| | Substrate prior to formation of fine particle-like projections | | | Substrate after formation of fine particle-like projections Fine particle-like projections | | | | CSS test | |
|---|---|---|---|---|---|---|---|---|---|
| Sample Disk No. | Kind | Height of bulge (Å) | Pitch of bulges (μm) | Height (Å) | Ratio of height to planewise length | Surface density (numbers/$mm^2$) | Width of band (μm) | results (number of times) | Adhesion test results |
| 1 | A | 60 | 0.5 | 150 | 0.8 | $1 \times 10^8$ | — | above 50,000 | Δ |

TABLE-continued

| | Substrate prior to formation of fine particle-like projections | | | Substrate after formation of fine particle-like projections Fine particle-like projections | | | | | |
|---|---|---|---|---|---|---|---|---|---|
| Sample Disk No. | Kind | Height of bulge (Å) | Pitch of bulges (μm) | Height (Å) | Ratio of height to planewise length | Surface density (numbers/mm²) | Width of band (μm) | CSS test results (number of times) | Adhesion test results |
| 2 | A | 60 | 0.5 | 400 | 0.8 | $5 \times 10^7$ | — | above 50,000 | Δ |
| 3 | B | 120 | 0.5 | 300 | 0.5 | $1 \times 10^8$ | — | above 50,000 | ○ |
| 4 | B | 120 | 0.5 | 400 | 0.8 | $5 \times 10^7$ | — | above 50,000 | ○ |
| 5 | B | 120 | 0.5 | 150 | 0.8 | $1 \times 10^9$ | — | above 50,000 | ○ |
| 6 | B | 120 | 0.5 | 150 | 0.8 | $3 \times 10^6$ | — | 23,000 (head crush) | ○ |
| 7 | B | 120 | 0.5 | 50 | 0.8 | $1 \times 10^9$ | — | 35,000 (head crush) | Δ |
| 8 | C | 300 | 1.0 | 400 | 0.8 | $1 \times 10^7$ | — | above 50,000 | ○ |
| 9 | C | 300 | 1.0 | 300 | 0.5 | $1 \times 10^8$ | — | above 50,000 | ○ |
| 10 | C | 300 | 1.0 | 150 | 0.8 | $1 \times 10^8$ | — | above 50,000 | ○ |
| 11 | C | 300 | 1.0 | 100 | 0.5 | $5 \times 10^8$ | — | above 50,000 | ○ |
| 12 | C | 300 | 1.0 | 50 | 0.8 | $1 \times 10^8$ | — | 31,000 (head crush) | Δ |
| 13 | D | — | — | 400 | 0.8 | $1 \times 10^8$ | 2 | above 50,000 | ○ |
| 14 | D | — | — | 400 | 0.8 | $1 \times 10^8$ | 15 | above 50,000 | Δ |
| 15 | D | — | — | 150 | 0.8 | $1 \times 10^9$ | 4 | above 50,000 | ○ |
| 16 | D | — | — | 150 | 0.8 | $7 \times 10^9$ | 4 | 40,000 (head crush) | Δ |
| 17 | D | — | — | 50 | 0.8 | $1 \times 10^9$ | 4 | 26,000 (head crush) | Δ |
| 18 | E | — | — | 150 | 0.8 | $1 \times 10^8$ | 0.5 | above 50,000 | ○ |
| 19 | E | — | — | 150 | 0.8 | $1 \times 10^8$ | 0.2 | above 50,000 | ○ |
| (20)* | C | 300 | 1.0 | — | — | — | — | 5,000 (head crush) | Δ |
| (21)* | D | — | — | 150 | 0.8 | $1 \times 10^9$ | (entire surface) | above 50,000 | X |

As can be seen from the Table, in the case where the substrate has only the bulged portions formed by the texture processing (comparative example (20)), the CSS withstanding ability is poor (that is, 5000) under the above test conditions. However, the examples of the present invention exhibited good results (that is, more than 20000). Also, in the case where the fine particle-like projections are formed on and distributed over the entire flat smooth surface, the results of the adhering test are of X level. However, with respect to the examples of the present invention, the results of the adhering test are of a practical level (Δ or ○).

As described above, in the present invention, instead of utilizing only the bulged portions formed by the conventional texture processing, a combination of bulged portions and fine particle-like projections is used. Alternatively, the bands of the fine particle-like projections are formed on the flat smooth surface of the substrate in the circumferential direction of the disk, or the fine particle-like projections are arranged at a high density to form the bands of the fine particle-like projections extending in the circumferential direction of the disk. With such construction, the CSS withstanding ability and the head adhesion prevention ability can be secured at those areas or regions having a low surface roughness and a high recording density.

What is claimed is:

1. A magnetic disk, comprising:

a thin-film magnetic layer;

a non-magnetic substrate having bulged portions which extend substantially parallel to a direction of movement of a magnetic head relative to the magnetic disk, said substrate having fine particle-like projections formed at least on said buldged portions, said projections having a height in a range of 100 to 500 Angstroms, a ratio of height to width of said projections in a direction of a plane of said substrate being greater than or equal to 0.1 and a surface density of said projections being in a range of $1 \times 10^7/mm^2$ to $1 \times 10^9 mm^2$, said magnetic layer being formed on said substrate;

a protective layer formed on said magnetic layer; and a lubricant layer formed on said protective layer.

2. A magnetic disk, comprising; a thin-film magnetic layer;

a non-magnetic substrate having fine particle-like projections, said projections having a height in a range of 100 to 500 Angstroms, a ratio of height to width of said projections in a direction of a plane of said substrate being greater than or equal to 0.1 and being arranged to include bands thereof extending substantially parallel to a direction of movement of a magnetic head relative to the magnetic disk, a surface density of said projections at regions of said bands being in a range of $1 \times 10^7/mm^2$ to $1 \times 10^9/mm^2$ which is higher than a surface density of said projections at regions outside said bands, said magnetic layer being formed on said substrate;

a protective layer formed on said magnetic layer; and a lubricant layer formed on said protective layer.

3. A magnetic disk, comprising:

a thin-film magnetic layer;

a non-magnetic substrate having bands of fine particle-like projections which extend substantially parallel to a direction of movement of a magnetic head relative to the magnetic disk, said projections having a height in a range of 100 to 500 Angstroms, a ratio of height to width of said projections in a direction of a plane of said substrate being greater than or equal to 0.1 and a surface density of said projections being in a range of $1 \times 10^7/mm^2$ to $1 \times 10^9 mm^2$, said magnetic layer being formed on said substrate;

a protective layer formed on said magnetic layer; and a lubricant layer formed on said protective layer.

* * * * *